United States Patent
Perisic et al.

(10) Patent No.: US 9,770,991 B2
(45) Date of Patent: Sep. 26, 2017

(54) SYSTEMS AND METHODS FOR INITIALIZING A CHARGING SYSTEM

(71) Applicant: GM GLOBAL TECHNOLOGY OPERATIONS LLC, Detroit, MI (US)

(72) Inventors: Milun Perisic, Cypress, CA (US); Ray M. Ransonm, Big Bear City, CA (US); Lateef A. Kojouke, San Pedro, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 13/907,703

(22) Filed: May 31, 2013

(65) Prior Publication Data

US 2014/0354241 A1 Dec. 4, 2014

(51) Int. Cl.
*B60L 11/00* (2006.01)
*B60L 11/18* (2006.01)
*B60L 15/00* (2006.01)

(52) U.S. Cl.
CPC ......... *B60L 11/1816* (2013.01); *B60L 11/005* (2013.01); *B60L 11/1803* (2013.01); *B60L 11/1887* (2013.01); *B60L 15/007* (2013.01); *B60L 2210/12* (2013.01); *B60L 2210/14* (2013.01); *B60L 2210/30* (2013.01); *B60L 2210/42* (2013.01); *B60L 2210/44* (2013.01); *Y02T 10/645* (2013.01);
(Continued)

(58) Field of Classification Search
CPC .................... B60L 11/1816; B60L 11/1887
USPC .................................................. 320/148, 162
See application file for complete search history.

(56) References Cited

U.S. PATENT DOCUMENTS 3,551,778 A * 12/1970 Ekstrom ......................... 363/79
4,400,624 A *  8/1983 Ebert, Jr. ........................ 307/43
(Continued)

FOREIGN PATENT DOCUMENTS

CN        2710247 Y      7/2005
CN      101022970 A      8/2007
(Continued)

OTHER PUBLICATIONS

State Intellectual Property Office of the People's Republic of China, Office Action for Chinese Application No. 201110349804.9, mailed Dec. 4, 2013.
(Continued)

*Primary Examiner* — Samuel Berhanu
*Assistant Examiner* — Tarikh Rankine
(74) *Attorney, Agent, or Firm* — Lorenz & Kopf, LLP

(57) ABSTRACT

Systems and methods are provided for charging a battery. The system, for example, includes, but is not limited to a first interface configured to receive a voltage from an AC voltage source, a matrix conversion module comprising a plurality of switches electrically connected to the first interface and configured to provide a charging voltage to the battery, and a controller communicatively connected to the matrix conversion module, wherein the controller is configured to: determine a voltage of the battery, determine an angle of the AC voltage source to initiate charging of the battery based upon the voltage of the battery, and control the plurality of switches to provide the charging voltage to the battery between the determined angle of the AC voltage source and a subsequent zero-crossing of the AC voltage source.

20 Claims, 5 Drawing Sheets

(52) U.S. Cl.
CPC ........ *Y02T 10/7022* (2013.01); *Y02T 10/7072* (2013.01); *Y02T 10/7225* (2013.01); *Y02T 10/7233* (2013.01); *Y02T 10/7241* (2013.01); *Y02T 90/127* (2013.01); *Y02T 90/14* (2013.01); *Y02T 90/16* (2013.01); *Y02T 90/34* (2013.01)

(56) References Cited

U.S. PATENT DOCUMENTS

| | | | |
|---|---|---|---|
| 4,626,978 A * | 12/1986 | Thouvenin | H02M 5/4505 219/665 |
| 4,669,036 A | 5/1987 | Cowett, Jr. | |
| 5,159,539 A | 10/1992 | Koyama | |
| 5,189,603 A | 2/1993 | Sashida et al. | |
| 5,274,538 A | 12/1993 | Sashida et al. | |
| 5,283,726 A | 2/1994 | Wilkerson | |
| 5,285,365 A | 2/1994 | Yamato et al. | |
| 5,418,707 A | 5/1995 | Shimer et al. | |
| 5,461,297 A | 10/1995 | Crawford | |
| 5,483,142 A * | 1/1996 | Skibinski et al. | 320/166 |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |
| 6,351,397 B1 | 2/2002 | Sawa et al. | |
| 6,496,343 B2 | 12/2002 | Mahlein et al. | |
| 6,538,909 B2 | 3/2003 | Goodarzi et al. | |
| 6,566,764 B2 | 5/2003 | Rebsdorf et al. | |
| 6,583,519 B2 | 6/2003 | Aberle et al. | |
| 6,614,132 B2 | 9/2003 | Hockney et al. | |
| 6,989,613 B2 | 1/2006 | Andrews et al. | |
| 6,998,732 B2 | 2/2006 | Xing et al. | |
| 7,317,625 B2 | 1/2008 | Zhang et al. | |
| 7,330,363 B2 | 2/2008 | Ponnaluri et al. | |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,558,087 B2 | 7/2009 | Meysenc et al. | |
| 7,599,204 B2 | 10/2009 | Kajouke et al. | |
| 7,609,022 B2 | 10/2009 | Oyobe et al. | |
| 7,679,941 B2 | 3/2010 | Raju et al. | |
| 7,764,527 B2 | 7/2010 | Takayanagi | |
| 8,063,606 B2 | 11/2011 | Veselic | |
| 8,199,545 B2 | 6/2012 | Nguyen et al. | |
| 8,288,887 B2 | 10/2012 | Ransom et al. | |
| 8,614,901 B2 | 12/2013 | Victor et al. | |
| 8,644,037 B2 | 2/2014 | Raju et al. | |
| 2001/0012207 A1 | 8/2001 | Nomura | |
| 2001/0026427 A1 | 10/2001 | Mahlein et al. | |
| 2001/0036086 A1 | 11/2001 | Pascu et al. | |
| 2002/0044468 A1 | 4/2002 | Goodarzi et al. | |
| 2002/0109406 A1 | 8/2002 | Aberle et al. | |
| 2002/0176261 A1 | 11/2002 | Norrga | |
| 2003/0002302 A1 * | 1/2003 | Berringer | 363/39 |
| 2003/0102718 A1 | 6/2003 | Hockney et al. | |
| 2004/0026929 A1 | 2/2004 | Rebsdorf et al. | |
| 2004/0041543 A1 | 3/2004 | Brooks et al. | |
| 2004/0066663 A1 | 4/2004 | Raichle | |
| 2004/0119449 A1 | 6/2004 | Matley | |
| 2004/0252532 A1 | 12/2004 | Lee et al. | |
| 2004/0257271 A1 | 12/2004 | Jacobson et al. | |
| 2005/0206343 A1 | 9/2005 | Ichinose et al. | |
| 2005/0270813 A1 | 12/2005 | Zhang et al. | |
| 2006/0176028 A1 | 8/2006 | Schulte et al. | |
| 2007/0035265 A1 | 2/2007 | Balog, Jr. et al. | |
| 2007/0139975 A1 | 6/2007 | Yamauchi et al. | |
| 2007/0274109 A1 | 11/2007 | Oyobe et al. | |
| 2008/0013351 A1 | 1/2008 | Alexander | |
| 2008/0055938 A1 | 3/2008 | Kajouke et al. | |
| 2008/0055954 A1 | 3/2008 | Kajouke et al. | |
| 2008/0130339 A1 | 6/2008 | McDonald et al. | |
| 2008/0198632 A1 | 8/2008 | Takayanagi | |
| 2009/0033393 A1 | 2/2009 | Park et al. | |
| 2009/0189456 A1 | 7/2009 | Skutt | |
| 2009/0251938 A1 | 10/2009 | Hallak | |
| 2009/0322287 A1 | 12/2009 | Ozeki et al. | |
| 2010/0103703 A1 | 4/2010 | Nishiyama et al. | |
| 2010/0237825 A1 * | 9/2010 | Suzuki | H02J 7/1492 320/107 |
| 2010/0244773 A1 | 9/2010 | Kajouke | |
| 2010/0244775 A1 | 9/2010 | Smith | |
| 2010/0259218 A1 | 10/2010 | Gale et al. | |
| 2011/0031927 A1 | 2/2011 | Kajouke et al. | |
| 2011/0031930 A1 | 2/2011 | Kajouke | |
| 2011/0032732 A1 | 2/2011 | Hsu | |
| 2011/0080151 A1 | 4/2011 | Rahardjo et al. | |
| 2011/0089928 A1 | 4/2011 | O'Gorman et al. | |
| 2011/0115285 A1 | 5/2011 | Ransom et al. | |
| 2011/0227407 A1 * | 9/2011 | Ransom | 307/9.1 |
| 2011/0254377 A1 * | 10/2011 | Wildmer et al. | 307/104 |
| 2012/0014140 A1 * | 1/2012 | Kajouke et al. | 363/20 |
| 2012/0047929 A1 | 3/2012 | Delorme et al. | |
| 2012/0112549 A1 | 5/2012 | Perisic et al. | |
| 2012/0113683 A1 | 5/2012 | Perisic et al. | |
| 2012/0113700 A1 | 5/2012 | Kajouke et al. | |
| 2012/0126755 A1 | 5/2012 | Perisic et al. | |
| 2012/0268078 A1 | 10/2012 | Kajouke et al. | |
| 2012/0275200 A1 * | 11/2012 | Bajan | H02M 7/53871 363/36 |
| 2012/0306454 A1 * | 12/2012 | Ransom | H02J 7/022 320/145 |
| 2013/0049703 A1 | 2/2013 | Perisic et al. | |
| 2013/0188407 A1 * | 7/2013 | Uguen et al. | 363/126 |

FOREIGN PATENT DOCUMENTS

| | | |
|---|---|---|
| CN | 101136594 A | 3/2008 |
| CN | 101136596 A | 3/2008 |
| CN | 101150281 A | 3/2008 |
| CN | 101166001 A | 4/2008 |
| CN | 101217255 A | 7/2008 |
| CN | 100410742 C | 8/2008 |
| CN | 101263648 A | 9/2008 |
| CN | 101465609 A | 6/2009 |
| CN | 101675580 A | 3/2010 |
| CN | 101847888 A | 9/2010 |
| CN | 101854068 A | 10/2010 |
| CN | 101997323 A | 3/2011 |
| CN | 102029926 A | 4/2011 |
| DE | 102007040550 A1 | 3/2008 |
| GB | 2459542 A | 11/2009 |
| JP | 2008306855 A | 12/2008 |

OTHER PUBLICATIONS

State Intellectual Property Office of the People's Republic of China, Office Action for Chinese Patent Application No. 201110349847.7, mailed Dec. 23, 2013.
State Intellectual Property Office of the People's Republic of China, Office Action for Chinese Patent Application No. 201110349850.9, mailed Dec. 25, 2013.
State Intellectual Property Office of the People's Republic of China, Office Action for Chinese Patent Application No. 201210175351.7, mailed Mar. 10, 2014.
State Intellectual Property Office of the People's Republic of China, Office Action for Chinese Patent Application No. 201210117250.4, mailed Mar. 28, 2014.
USPTO, Final Office Action for U.S. Appl. No. 12/413,181, mailed Mar. 13, 2014.
State Intellectual Property Office of the People's Republic of China, Office Action for Chinese Patent Application No. 201210317459.5, mailed Apr. 23, 2014.
USPTO, Notice of Allowance and Fee(s) Due for U.S. Appl. No. 13/090,911, mailed Jun. 12, 2014.
USPTO, Notice of Allowance and Fee(s) Due for U.S. Appl. No. 13/222,961, mailed Jul. 8, 2014.
USPTO, Office Action in U.S. Appl. No. 12/413,181, mailed Aug. 15, 2013.
USPTO, Office Action in U.S. Appl. No. 12/941,488, mailed Mar. 20, 2013.
USPTO, Office Action in U.S. Appl. No. 12/949,439, mailed Nov. 9, 2012.

(56) References Cited

OTHER PUBLICATIONS

USPTO, Office Action in U.S. Appl. No. 12/941,552, mailed Oct. 24, 2012.
USPTO, Office Action in U.S. Appl. No. 12/839,134, mailed Aug. 29, 2012.
USPTO, Final Office Action in U.S. Appl. No. 12/535,975, mailed Aug. 2, 2012.
USPTO, Office Action in U.S. Appl. No. 12/725,265, mailed Jul. 23, 2012.
USPTO, Final Office Action in U.S. Appl. No. 12/535,994, mailed Jun. 28, 2012.
USPTO, Final Office Action in U.S. Appl. No. 12/413,181, mailed May 10, 2012.
USPTO, Office Action in U.S. Appl. No. 12/535,975, mailed Feb. 8, 2012.
USPTO, Office Action in U.S. Appl. No. 12/535,994, mailed Jan. 23, 2012.
USPTO, Office Action in U.S. Appl. No. 12/622,088, mailed Nov. 25, 2011.
USPTO, Office Action in U.S. Appl. No. 12/413,181, mailed Oct. 5, 2011.
USPTO, Response to Office Action in U.S. Appl. No. 12/941,488, mailed Jun. 19, 2013.
USPTO, Response to Office Action in U.S. Appl. No. 12/949,439, mailed Feb. 8, 2013.
USPTO, Response to Office Action in U.S. Appl. No. 12/941,552, mailed Jan. 22, 2013.
USPTO, Response to Office Action in U.S. Appl. No. 12/839,134, mailed Nov. 28, 2012.
USPTO, Response to Office Action in U.S. Appl. No. 12/535,975, mailed Nov. 2, 2012.
USPTO, Response to Office Action in U.S. Appl. No. 12/725,265, mailed Oct. 22, 2012.
USPTO, Response to Office Action in U.S. Appl. No. 12/535,994, mailed Aug. 28, 2012.
USPTO, Response to Office Action in U.S. Appl. No. 12/413,181, mailed Aug. 10, 2012.
USPTO, Response to Office Action in U.S. Appl. No. 12/535,975, mailed May 4, 2012.
USPTO, Response to Office Action in U.S. Appl. No. 12/535,994, mailed Apr. 20, 2012.
USPTO, Response to Office Action in U.S. Appl. No. 12/622,088, mailed Feb. 21, 2012.
USPTO, Response to Office Action in U.S. Appl. No. 12/413,181, mailed Dec. 29, 2011.
USPTO, Notice of Allowance in U.S. Appl. No. 12/941,488, mailed Jul. 31, 2013.
USPTO, Notice of Allowance in U.S. Appl. No. 12/949,439, mailed Mar. 25, 2013.
USPTO, Notice of Allowance in U.S. Appl. No. 12/941,552, mailed Feb. 20, 2013.
USPTO, Notice of Allowance in U.S. Appl. No. 12/839,134, mailed Jan. 25, 2013.
USPTO, Notice of Allowance in U.S. Appl. No. 12/535,975, mailed Nov. 16, 2012.
USPTO, Notice of Allowance in U.S. Appl. No. 12/725,265, mailed Nov. 15, 2012.
USPTO, Notice of Allowance in U.S. Appl. No. 12/535,994, mailed Sep. 7, 2012.
USPTO, Notice of Allowance in U.S. Appl. No. 12/622,088, mailed Jun. 11, 2012.
Chu, Grace, et al., "A Unified Approach for the Derivation of Robust Control for Boost PFC Converters," IEEE Transactions on Power Electronics, Nov. 2009, pp. 2531-2544, vol. 24, Issue: 11.
Figueres, Emilio, et al., "A Control Circuit With Load-Current Injection for Single-Phase Power-Factor-Correction Rectifiers," IEEE Transactions on Industrial Electronics, Jun. 2007, pp. 1272-1281, vol. 54, No. 3.
Prathapan, Parag T., et al., "Feedforward Current Control of Boost-Derived Single-Phase PFC Converters," IEEE Applied Power Electronics Conference and Exposition, Mar. 2005, pp. 1716-1722, vol. 3.
German Patent and Trade Mark Office, Office Action in German Patent Application No. 10 2011 085 063.5, mailed Mar. 21, 2012.
German Patent and Trade Mark Office, Office Action in German Patent Application No. 10 2010 031 615.6, mailed Jan. 27, 2012.
State Intellectual Property Office of the P.R.C., Office Action in China Patent Application No. 201010145484.0, mailed Jul. 12, 2013.
State Intellectual Property Office of the P.R.C., Office Action in China Patent Application No. 201010556242.0, mailed Feb. 1, 2013.
State Intellectual Property Office of the P.R.C., Office Action in China Patent Application No. 201010145484.0, mailed Jan. 28, 2013.
State Intellectual Property Office of the P.R.C., Office Action in China Patent Application No. 201010247400.4, mailed Jan. 23, 2013.
USPTO, Notice of Allowance and Fee(s) Due for U.S. Appl. No. 13/222,961, mailed Sep. 18, 2013.
USPTO, Notice of Allowance and Fee(s) Due for U.S. Appl. No. 13/149,484, mailed Oct. 11, 2013.
State Intellectual Property Office of the People's Republic of China, Office Action for Chinese Patent Application No. 201010145484.0, mailed Apr. 27, 2012.
State Intellectual Property Office of the People's Republic of China, Response to Office Action for Chinese Patent Application No. 201010145484.0, mailed Sep. 12, 2012.
State Intellectual Property Office of the People's Republic of China, Office Action in Chinese Patent Application No. 201410236576.8 mailed Jan. 26, 2016.
State Intellectual Property Office of the People's Republic of China, Office Action in Chinese Patent Application No. 201410236576.8 mailed Mar. 23, 2017.

\* cited by examiner

SYSTEMS AND METHODS FOR INITIALIZING A CHARGING SYSTEM

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to a control strategy initiating an energy delivery system.

BACKGROUND

Plug-in Hybrid and fully electric vehicles have become increasingly popular in recent years. These vehicles typically have large battery systems which can take many hours to charge while consuming large amounts of power. Current charging systems for the battery systems are configured to be plugged in to a residential or commercial power grid. However, when the charging system is first connected, large voltage spikes can be created which could potentially damage the charging system and the battery system.

BRIEF SUMMARY

In accordance with one embodiment, a charging system is provided. The charging system may include, but is not limited to, a first interface configured to receive a voltage from an AC voltage source, a matrix conversion module comprising a plurality of switches electrically connected to the first interface and configured to provide a charging voltage to the battery, and a controller communicatively connected to the matrix conversion module, wherein the controller is configured to: determine a voltage of the battery, determine an angle of the AC voltage source to initiate charging of the battery based upon the voltage of the battery, and control the plurality of switches to provide the charging voltage to the battery between the determined angle of the AC voltage source and a subsequent zero-crossing of the AC voltage source.

In accordance with another embodiment, a method for charging a battery using an alternating current (AC) voltage source coupled to a matrix conversion module is provided. The method may include, but is not limited to determining, by a control module, a voltage of the battery, determining, by the control module, an angle of the AC voltage source to initiate charging of the battery based upon the voltage of the battery, and controlling, by the control module, the matrix conversion module to provide a charging voltage to the battery between the determined angle of the AC voltage source and a subsequent zero-crossing of the AC voltage source.

In accordance with yet another embodiment, a charging system for charging a battery is provided. The charging system may include, but is not limited to a first interface configured to receive a voltage from an alternative current (AC) voltage source, an energy conversion module comprising a plurality of switches electrically connected to the first interface and configured to provide a charging voltage to the battery, and a controller communicatively connected to the energy conversion module, wherein the controller is configured to: control the plurality of switches to provide the charging voltage to the battery when a voltage of the battery is less than a peak voltage of the AC voltage source between a determined angle of the AC voltage source and a subsequent zero-crossing of the AC voltage source, and control the plurality of switches to provide a boosted voltage to the battery when the voltage of the battery is greater than a peak voltage of the AC voltage source.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 illustrates exemplary control signals which may be utilized during the first phase for initiating an electrical system, in accordance with one embodiment;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Figure 1:
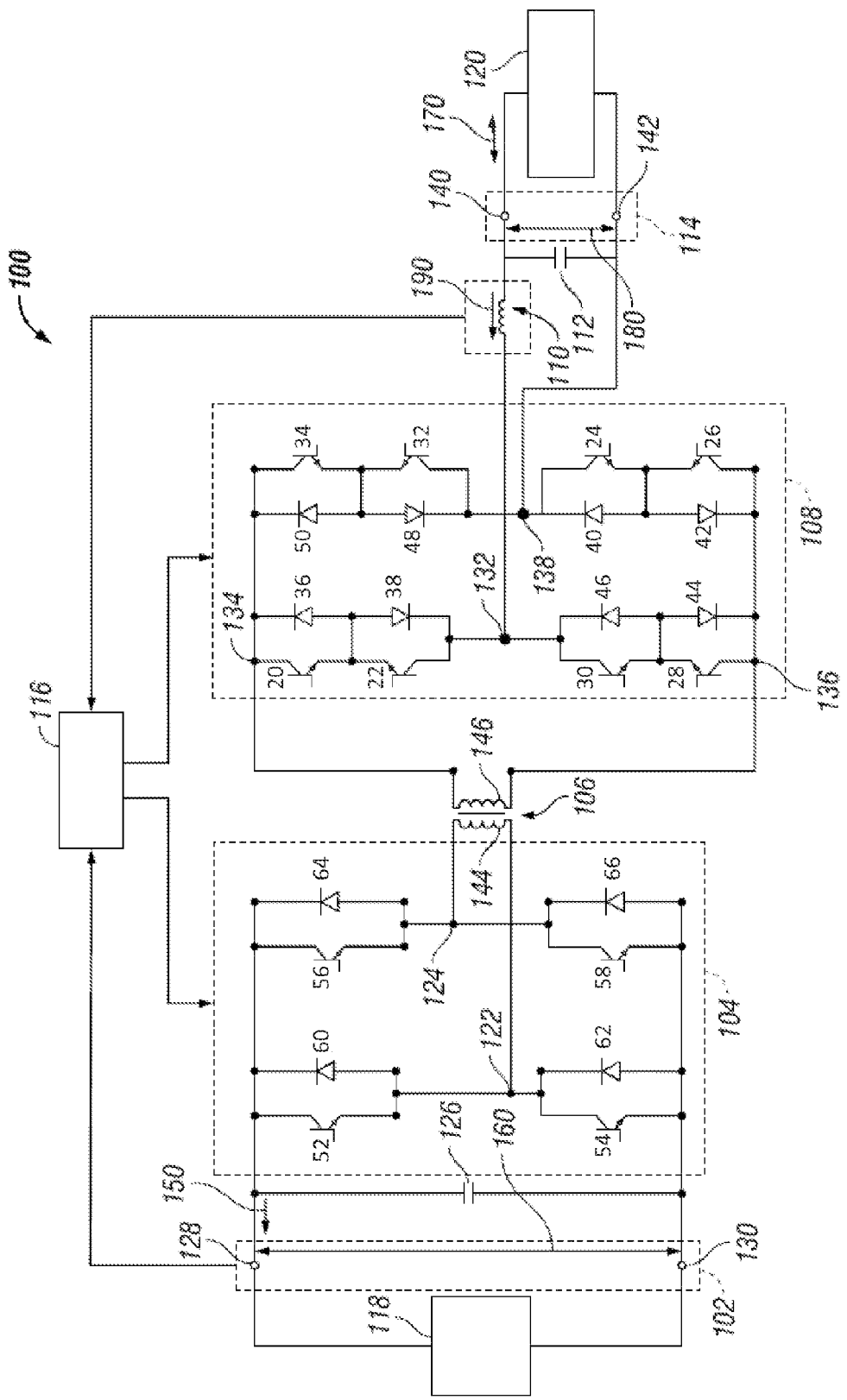
FIG. 1 is a schematic diagram of an electrical system suitable for use in a vehicle in accordance with an embodiment.

FIG. 1 depicts an exemplary embodiment of an electrical system 100 (or alternatively, a charging system, charger or charging module) suitable for use in a vehicle, such as, for example, an electric and/or hybrid vehicle. While the description below relates to a charging system for an electric and/or hybrid vehicle, one of ordinary skill in the art would recognize that other electrical systems could be created or modified to take advantage of the features discussed herein.

The electrical system 100 includes, without limitation, a first interface 102, a first energy conversion module 104, an isolation module 106, a second energy conversion module 108, an inductive element 110, a capacitive element 112, a second interface 114, and a control module 116. The first interface 102 generally represents the physical interface (e.g., terminals, connectors, and the like) for coupling the electrical system 100 to a DC energy source 118 and the second interface 114 generally represents the physical interface (e.g., terminals, connectors, and the like) for coupling the electrical system 100 to an alternating current (AC) energy source 120. Accordingly, for convenience, the first interface 102 may be referred to herein as the DC interface and the second interface 114 may be referred to herein as the AC interface. In an exemplary embodiment, the control module 116 is coupled to the conversion modules 104, 108 and operates the conversion modules 104, 108 to achieve a desired power flow from the AC energy source 120 to the DC energy source 118, as described in greater detail below.

In an exemplary embodiment, the DC energy source 118 (or alternatively, the energy storage source or ESS) is capable of receiving a direct current ($i_{DC}$) (indicated by arrow 150) from the electrical system 100 at a particular DC voltage level ($V_{DC}$) (indicated by arrow 160). In accordance with one embodiment, the DC energy source 118 is realized as a rechargeable high-voltage battery pack having a nominal DC voltage range from about two hundred to about five hundred Volts DC. In this regard, the DC energy source 118 may comprise the primary energy source for another electrical system and/or an electric motor in a vehicle. For example, the DC energy source 118 may be coupled to a power inverter that is configured to provide voltage and/or current to the electric motor, which, in turn, may engage a transmission to drive the vehicle in a conventional manner. In other embodiments, the DC energy source 118 may be realized as a battery, a fuel cell, an ultracapacitor, or another suitable energy storage element.

The AC energy source 120 (or power source) is configured to provide an AC current ($i_{AC}$) (indicated by arrow 170) to the charging system 100 at a particular AC voltage level ($V_{AC}$) (indicated by arrow 180) and may be realized as a main power supply or main electrical system for a building, residence, or another structure within an electric power grid (e.g., mains electricity or grid power). In accordance with one embodiment, the AC energy source 120 comprises a single-phase power supply, as is common to most residential structures, which varies depending on the geographic region. For example, in the United States, the AC energy source 120 may be realized as 220 Volts (RMS) or 240 Volts (RMS) at 60 Hz, while in other regions the AC energy source 120 may be realized as two-hundred ten Volts (RMS) or two-hundred twenty volts (RMS) at fifty Hz. In alternative embodiments, the AC energy source 120 may be realized as any AC energy source suitable for operation with the charging system 100.

As described in greater detail below, the DC interface 102 is coupled to the first conversion module 104 and the AC interface 114 is coupled to the second conversion module 108 via the inductive element 110. The isolation module 106 is coupled between the conversion modules 104, 108 and provides galvanic isolation between the two conversion modules 104, 108. The control module 116 is coupled to the conversion modules 104 and 108 and operates the second conversion module 108 to convert energy from the AC energy source 120 to high-frequency energy across the isolation module 106 which is then converted to DC energy at the DC interface 102 by the conversion module 104. It should be understood that although the subject matter may be described herein in the context of a grid-to-vehicle application (e.g., the AC energy source 120 delivering energy to the DC energy source 118) for purposes of explanation, in other embodiments, the subject matter described herein may be implemented and/or utilized in vehicle-to-grid applications (e.g., the DC energy source 118 delivering energy to the AC interface 114 and/or AC energy source 120).

In order to charge the DC energy source 118, the first conversion module 104 converts high-frequency energy at nodes 122 and 124 to DC energy that is provided to the DC energy source 118 at the DC interface 102. In this regard, the first conversion module 104 operates as a rectifier when converting high frequency AC energy to DC energy. In the illustrated embodiment, the first conversion module 104 comprises four switching elements (52, 54, 56 and 58) with each switching element having a diode (60, 62, 64 and 68) configured antiparallel to the respective switching element to accommodate bidirectional energy delivery. As shown, a capacitor 126 is configured electrically in parallel across the DC interface 102 to reduce voltage ripple at the DC interface 102, as will be appreciated in the art.

In an exemplary embodiment, the switching elements (52, 54, 56 and 58) are transistors, and may be realized using any suitable semiconductor transistor switch, such as an insulated gate bipolar transistor, a metal-oxide semiconductor field effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 118 for charging the DC energy source 118 when the respective switch is off. As described in greater detail below, in an exemplary embodiment, the control module 116 operates the switches of the first conversion module 104 to provide a path for current from the DC energy source 118 to the isolation module 106 to provide an injection current at nodes 134, 136 of the second conversion module 108.

In the illustrated embodiment, switch 52 is connected between node 128 of the DC interface 102 and node 122 and configured to provide a path for current flow from node 128 to node 122 when switch 52 is closed. Diode 60 is connected between node 122 and node 128 and configured to provide a path for current flow from node 122 to node 128 (e.g., diode 60 is antiparallel to switch 52). Switch 54 is connected between node 130 of the DC interface 102 and node 122 and configured to provide a path for current flow from node 122 to node 130 when switch 54 is closed, while diode 62 is connected between node 122 and node 130 and configured to provide a path for current flow from node 130 to node 122. In a similar manner, switch 56 is connected between node 128 and node 124 and configured to provide a path for current flow from node 128 to node 124 when switch 56 is closed, diode 64 is connected between node 124 and the DC interface 102 and configured to provide a path for current flow from node 124 to node 128, switch 58 is connected between node 130 and node 124 and configured to provide a path for current flow from node 124 to node 130 when switch 58 is closed, and diode 66 is connected between node 124 and the DC interface 102 and configured to provide a path for current flow from the node 130 to node 124.

In an exemplary embodiment, the second conversion module 108 facilitates the flow of current (or energy) from the AC energy source 120 and/or inductive element 110 to the isolation module 106. In the illustrated embodiment, the second conversion module 108 is realized as a front end single-phase matrix converter comprising eight switching elements (20, 22, 24, 26, 28, 30, 32 and 34) with each switching element having a diode (36, 38, 40, 42, 44, 46, 48 and 50) configured antiparallel to the respective switching element, in a similar manner as set forth above in regards to the first conversion module 104. For convenience, but without limitation, the second conversion module 108 may alternatively be referred to herein as a matrix conversion module (or matrix converter) or a cycloconverter. As described in greater detail below, the control module 116 modulates (e.g., opens and/or closes) the switches (20, 22, 24, 26, 28, 30, 32 and 34) of the matrix converter 108 to produce a high-frequency voltage at nodes 122, 124 that achieves a desired power flow to the DC interface 102 and/or DC energy source 118.

In the illustrated embodiment of FIG. 1, a first pair of switches (20 and 22) and diodes (36 and 38) are coupled between node 132 and node 134, with the first pair of switch and antiparallel diode (e.g., 20 and 36) being configured with opposite polarity as the second pair of switch and antiparallel diode (e.g., 22 and 38). In this manner, switch 20 and diode 38 are configured to provide a path for current flow from node 134 through switch 20 and diode 38 to node 132 when switch 20 is closed, turned on, or otherwise activated and the voltage at node 134 is more positive than the voltage at node 132. Switch 22 and diode 36 are configured to provide a path for current flow from node 132 through switch 22 and diode 36 to node 134 when switch 22 is closed, turned on, or otherwise activated and the voltage at node 132 is more positive than the voltage at node 134. In a similar manner, a second pair of switches (24 and 26) and diodes (40 and 42) are coupled between node 136 and node 138, a third pair of switches (28 and 30) and diodes (44 and 46) are coupled between node 132 and node 136, a fourth pair of switches (32 and 34) and diodes (48 and 50) are coupled between node 134 and node 138.

In the illustrated embodiment, switches 22, 26, 30 and 34 comprise a first set of switches which are capable of commutating the current through the inductive element 110 ($i_L$) (indicated by arrow 190) from node 132 to node 138 when the current through the inductive element 110 is flowing in a negative direction (e.g., $i_L$<0) and switches 20, 24, 28, and 32 comprise a second set of switches that are capable of commutating the current through the inductive element 110 from node 138 to node 132 when the current through the inductive element 110 is flowing in a positive direction (e.g., $i_L$>0), as described in greater detail below. In other words, switches 22, 26, 30 and 34 are capable of conducting at least a portion of current flowing in a negative direction through the inductive element 110 (e.g., $i_L$<0) and switches 20, 24, 28, and 32 are capable of conducting at least a portion of current flowing in a positive direction through the inductive element 110 (e.g., $i_L$>0). As used herein, commutating should be understood as the process of cycling the current through the inductive element 110 through switches and diodes of the matrix converter 108 such that the flow of current through the inductive element 110 is not interrupted.

In an exemplary embodiment, the isolation module 106 comprises a first set of windings 144 connected between nodes 122 and 124 of the first conversion module 104 and a second set of windings 146 connected between nodes 134 and 136. For purposes of explanation, the windings 146 may be referred to herein as comprising the primary winding stage (or primary windings) and the sets of windings 144 may be referred to herein as comprising the secondary winding stage (or secondary windings). The windings 144 and 146 provide inductive elements that are magnetically coupled in a conventional manner to form a transformer, as will be appreciated in the art. In an exemplary embodiment, the isolation module 106 is realized as a high-frequency transformer. In this regard, the isolation module 106 comprises a transformer designed for a particular power level at a high-frequency, such as the switching frequency of the switches of the conversion modules 104 and 108 (e.g., 50 kHz), resulting in the physical size of the transformer being reduced relative to a transformer designed for the same power level at a lower frequency, such as the frequency of the AC energy source 120 (e.g., the mains frequency).

In an exemplary embodiment, the inductive element 110 is realized as an inductor configured electrically in series between node 132 of the matrix converter 108 and a node 140 of the AC interface 114. Accordingly, for convenience, but without limitation, the inductive element 110 is referred to herein as an inductor. The inductor 110 functions as a high-frequency inductive energy storage element during operation of the electrical system 100. The capacitive element 112 is realized as a capacitor coupled between node 140 and node 142 of the AC interface 114, and the capacitor 112 and inductor 110 are cooperatively configured to provide a high frequency filter to minimize voltage ripple at the AC interface 114, as will be appreciated in the art.

The control module 116 generally represents the hardware, firmware and/or software configured to operate and/or modulate the switches of the conversion modules 104 and 108 to achieve a desired power flow from the AC energy source 120 to the DC energy source 118. Depending on the embodiment, the control module 116 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

In one embodiment, for example, normal operation for grid-to-vehicle applications, i.e., when the DC energy source 118 is realized as a rechargeable high-voltage battery pack, occurs when the voltage of the battery pack is greater than the peak voltage of the AC energy source 120. Before the system can enter normal operation, i.e., when the voltage of the battery pack is less than the peak voltage of the AC energy source 120, the system operates in a start-up phase, as discussed in further detail below.

During normal operation, after the start-up period, for grid-to-vehicle applications, the control module 116 determines pulse-width modulated (PWM) command signals that control the timing and duty cycles of the switches (20-34) of the matrix converter 108 to produce a high-frequency AC voltage across the primary windings 146 of the isolation module 106 which induces a voltage across the secondary windings 144 at nodes 122 and 124 that results in a desired current ($i_{DC}$) flowing to the DC interface 102 to charge the DC energy source 118. For example, in accordance with one embodiment, the control module 116 generates a sinusoidal PWM variable duty cycle control signal that controls state machine transitions, and thereby, the duty cycle of the switches (20-34) to implement the appropriate switching pattern during a switching interval (e.g., the inverse of the switching frequency). The control module 116 obtains, monitors, or otherwise samples voltage at the DC interface 102 ($V_{DC}$) and compares the obtained DC voltage with a reference voltage (e.g., the desired voltage the DC interface 102) to obtain an error signal that is compared with high frequency carrier signal that corresponds to the switching frequency (e.g., 50 kHz) to obtain the sinusoidal PWM modulated duty cycle. When the error signal is less than the carrier signal, the control module 116 operates the switches 20-34 to effectively short-circuit nodes 132 and 138 and cycle energy through the matrix converter 108 to apply a voltage across the inductor 110. When the error signal is greater than the carrier signal, the control module 116 operates the switches (20-34) to release the stored energy and/or voltage of the inductor 110 (alternatively, the fly-back voltage). The sum of the fly-back voltage and the voltage at the AC interface 114 is applied to the primary windings 146 of the isolation module 106, resulting in a power transfer to nodes 122 and 124 and/or DC energy source 118. The control module 116 repeats the steps of operating the switches (20-34) to cycle energy through the matrix converter 108 when the error signal becomes less than the carrier signal and releasing the stored energy of the inductor 110 when the error signal is greater than the carrier signal. In this manner, the matrix converter 108 alternates between cycling energy through the inductor 110 and delivering energy to the isolation module 106 and/or DC interface 102 as needed throughout operation of the charging system 100.

It should be understood that FIG. 1 is a simplified representation of a electrical system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner. Additionally, although the electrical system 100 is described herein in the context of a matrix converter 108 for a vehicle, the subject matter is not intended to be limited to vehicular and/or automotive applications, and the subject matter described herein may be implemented in any application where an energy conversion module (e.g., buck converters, boost converters, power inverters, current source inverters and/or converters, voltage source inverters and/or converters, and the like) is utilized to transfer energy using switching elements.

Figure 2:
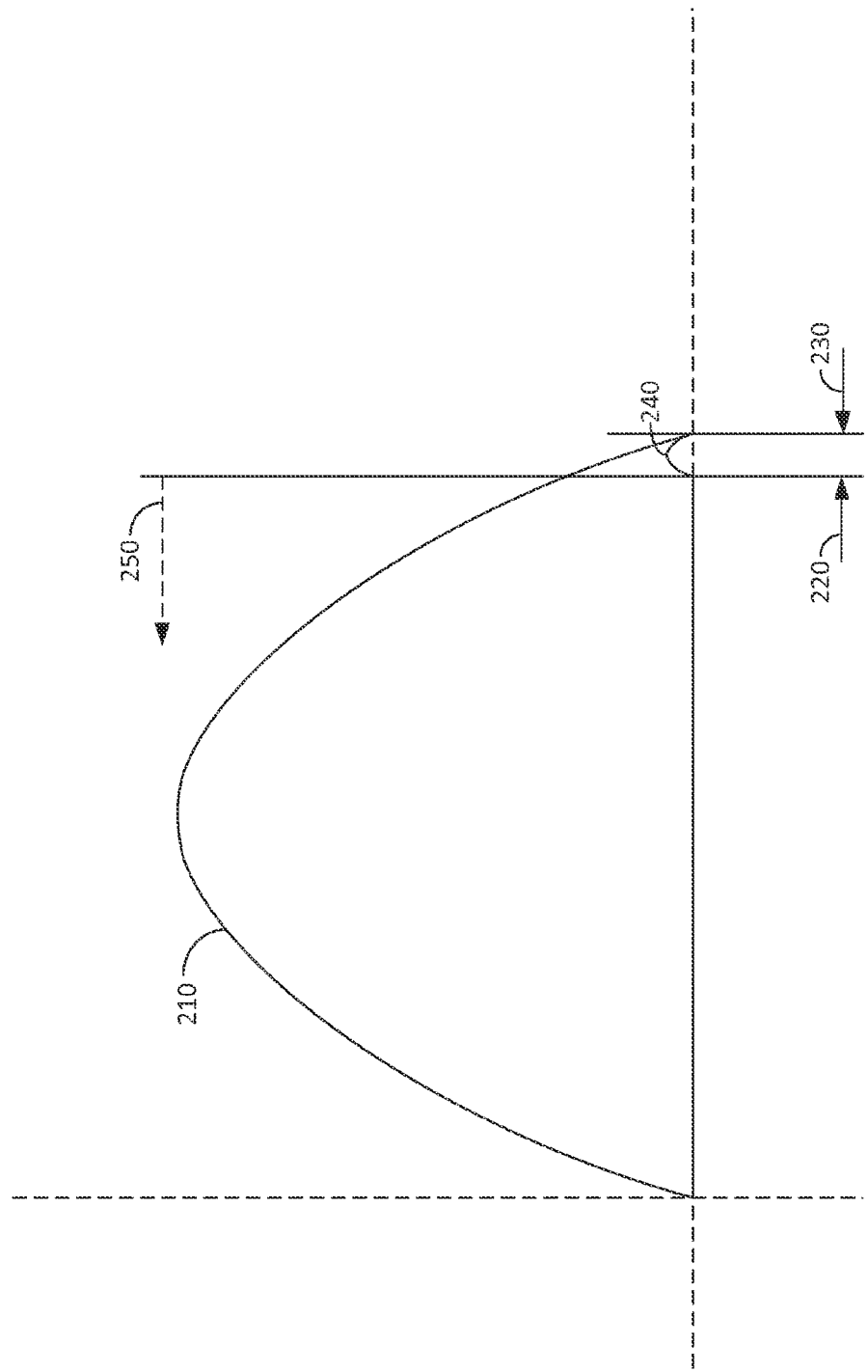
FIGS. 2-3 are graphical representations of the principals involved for charging a battery in a startup phase, in accordance with an embodiment.
Figure 3:
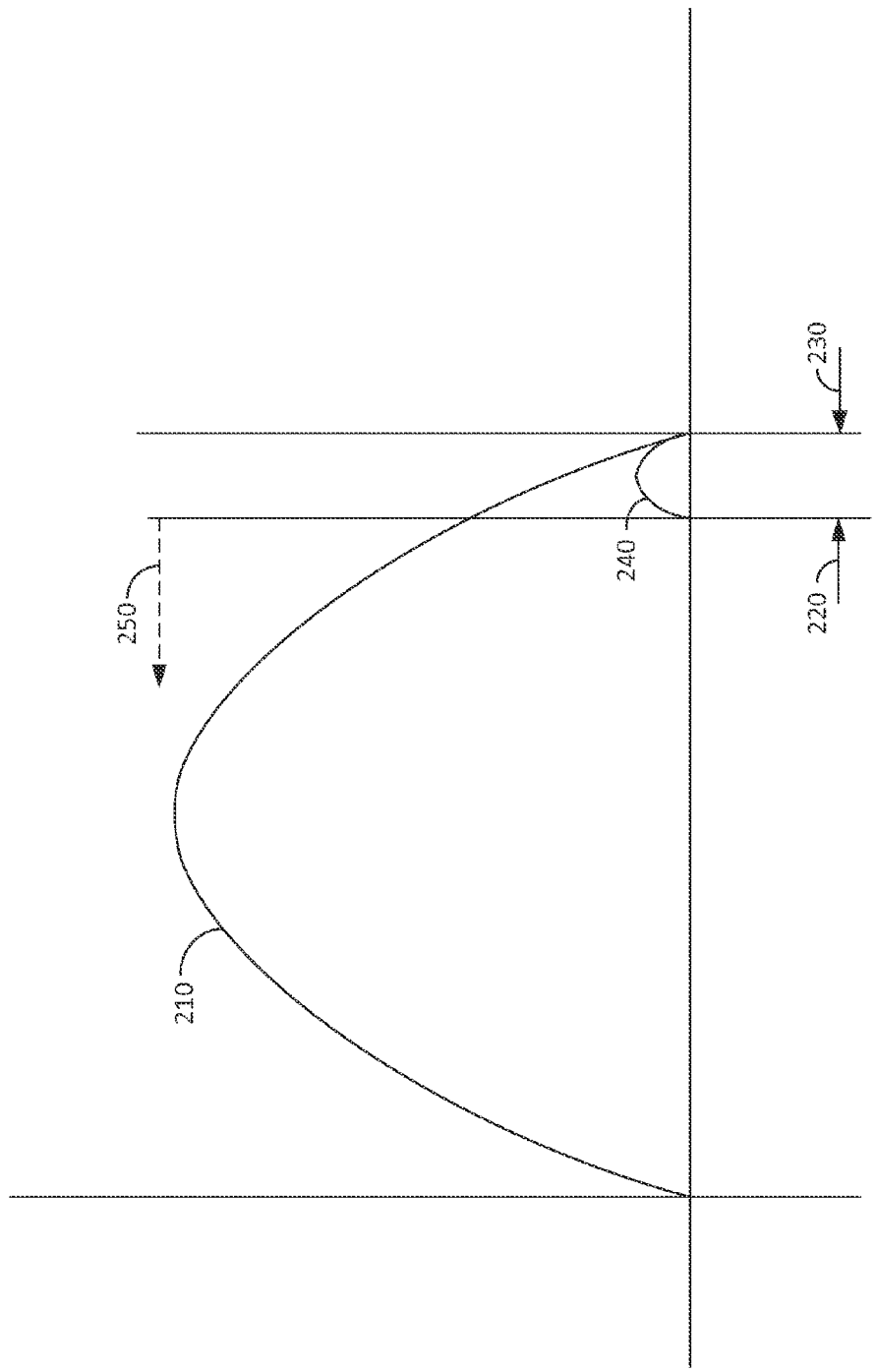

FIGS. 2-3 are graphical representations of the principals involved for charging a battery in a startup phase. As discussed above, the startup phase is used to charge the battery up to the peak voltage of the AC energy source 120 before the electrical system 100 enters normal operation. The curve 210 represents the output voltage of the AC energy source 120 illustrated in FIG. 1. As discussed in further detail below, the control module 116 determines an angle $\alpha_{ref}$ of the sinusoidal AC energy source 120. The control module 116 then generates a PWM variable duty cycle control signal that controls state machine transitions, and thereby, the duty cycle of the switches (20-34) to implement the appropriate switching pattern during a switching interval between the angle $\alpha_{ref}$ corresponding to arrow 220 in FIG. 2 and the zero crossing of the AC energy source 120 corresponding to arrow 230.

Accordingly, a current 240 is provided to the battery, for example, the DC energy source 118 illustrated in FIG. 1, during the period between the angle $\alpha_{ref}$ corresponding to arrow 220 in FIG. 2 and the zero crossing of the AC energy source 120. As the first conversion module 104 operates as a rectifier when converting high frequency AC energy to DC energy, the current 240 is provided to the battery during each half cycle of the AC energy source 120.

The angle $\alpha_{ref}$ corresponds to the current charge state of the battery. Accordingly, as the voltage of the battery rises, the control module 116 increases the length of time during which the current 240 is provided to the battery. As seen in FIG. 3, for example, the angle $\alpha_{ref}$ has changed in the direction of arrow 250, thereby increasing the length of time during which the current 240 is provided to the battery.

Figure 4:
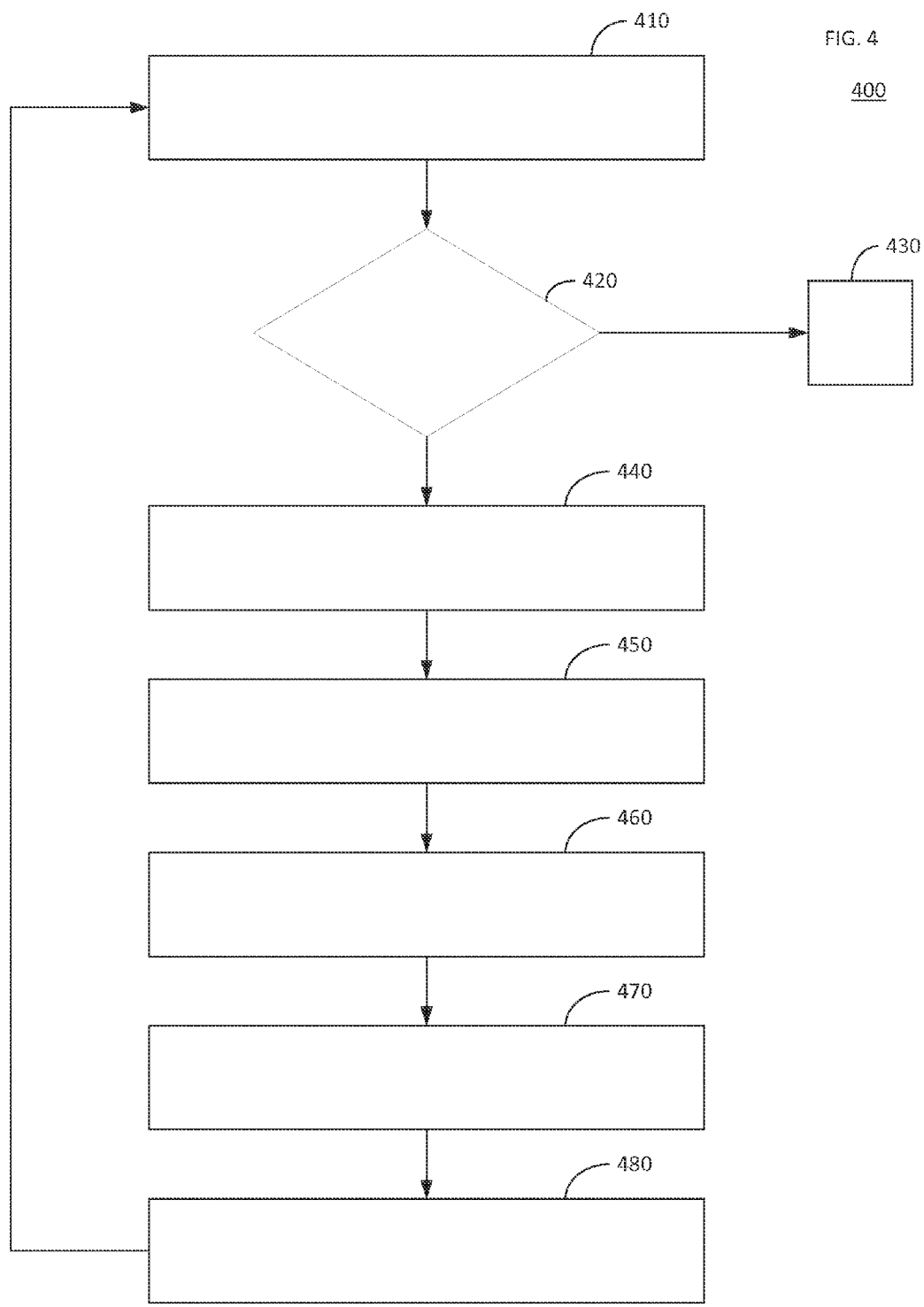
FIG. 4 is a flow chart illustrating an exemplary startup phase, in accordance with an embodiment.

FIG. 4 is a flow chart illustrating an exemplary startup phase, in accordance with an embodiment. The control module 116 first determines a voltage of the battery. (Step 410). In one embodiment, for example, the control module 116 may measure a voltage of the battery. In other embodiments, for example, the control module 116 may receive a voltage of the battery from a voltmeter (not illustrated). The control module then determines if the measured voltage of the battery is greater than the peak voltage of the AC energy source 120. (Step 420). If the measured voltage of the battery is greater than the peak voltage of the AC energy source 120, the control module begins normal operation, as discussed above. (Step 430).

If the measured voltage of the battery is less than the peak voltage of the AC energy source 120, the control module 116 then determines a difference between the desired battery voltage and the actual voltage of the battery. (Step 440). The control module 116 then multiples the difference between the desired battery voltage and the actual voltage of the battery based upon a predetermined variable. (Step 450). In one embodiment, for example, the predetermined variable may have a fixed gain component and a variable gain component. In one embodiment, for example, the variable gain component may be based upon a previously (i.e., previous cycle of the method illustrated in FIG. 4) determined reference angle $\alpha_{ref}$, as discussed in further detail below. The predetermined variable, having the variable gain component, being multiplied to the difference between the desired battery voltage and the actual voltage of the battery acts gradually increase the determined reference angle $\alpha_{ref}$. The fixed gain component and a variable gain component can be tuned experimentally to maintain desired charging performance during operations when $\alpha_{ref}$ stays between bounds $\alpha_{min}$ and $\alpha_{max}$. They have to be sufficiently low to avoid ringing of $\alpha_{ref}$.

The control module 116 then determines the reference angle $\alpha_{ref}$ based upon the result of the multiplication in step 450. (Step 460). In one embodiment, for example, a look-up table may be used to determine the reference angle $\alpha_{ref}$. The look-up table is filled with coefficients ranging between 0 and 0.5, as an equivalent of an angle normalized to half cycle of AC signal, where 0 and/or $\alpha_{min}$ means no charging current and the lesser between 0.5 and $\alpha_{max}$ means charging with maximum allowed current ILmax.

The control module 116 then determines if the determined reference angle $\alpha_{ref}$ is within an appropriate boundary. (Step 470). In one embodiment, for example, a lower bounder may be based off of the following equation:

$$\alpha min = \frac{1}{\pi}\arcsin\left(\frac{Vout}{Vacmax}\right) \quad \text{(Equation 1)}$$

Where $\alpha_{min}$ is the angle of the lower boundary, Vout is the actual battery voltage determined in step 410 and Vacmax is the peak voltage of the AC energy source 120.

In one embodiment, for example, the upper boundary $\alpha_{max}$ is determined based upon a multidimensional lookup table. A maximum desired current for the electrical system may be known. In one embodiment, for example, a maximum current may be twenty-five amps. However, the maximum current can vary depending upon the type of battery pack being charged and various other factors. The multidimensional lookup table may be based upon the following equation:

$$ILmax = \frac{Vacmax}{\omega L}\left(\frac{Vout}{Vacmax}\pi(\alpha min - \alpha max) + \cos(\pi\alpha min) - \cos(\pi\alpha max)\right) \quad \text{(Equation 2)}$$

where ILmax is the maximum desired current for the electrical system, $\omega$ is angular frequency in rad/s dependent on the grid frequency, and L is the inductance of inductive element 110. As the maximum desired current for the electrical system and the peak voltage of the AC source 120 are known, the actual battery voltage Vout is measured and the lower bounder $\alpha_{min}$ of the reference angle $\alpha_{ref}$ is calculated from equation 1, the multidimensional lookup table can be used to find the upper bounder $\alpha_{max}$ of the reference angle $\alpha_{ref}$ to correctly solve for the known maximum desired current ILmax of equation 2. Accordingly, the upper bounder $\alpha_{max}$ of the reference angle $\alpha_{ref}$ is a variable angle based upon the lower bounder $\alpha_{min}$ of the reference angle $\alpha_{ref}$ and the actual voltage of the battery Vout. In one embodiment, for example, the upper boundary $\alpha_{max}$ is capped at 0.5. In other words, the control module 116 can cause current to flow into the battery when the voltage of the AC energy source 120 is decreasing from a peak (i.e., either from the maximum positive peak illustrated in FIGS. 2 and 3, or from the maximum negative peak). If the determined reference angle $\alpha_{ref}$ is less than $\alpha_{min}$ or greater than $\alpha_{max}$, the control module 116 bounds the reference angle $\alpha_{ref}$ to the respective boundary. While FIGS. 2-3 and the above equations illustrate the control module 116 allowing current to flow into the battery when the voltage of the AC energy source 120 is decreasing, one of ordinary skill in the art would recognize that the system could be configured to only allow current to flow into the battery when the voltage of the AC energy source 120 is increasing.

Figure 5:
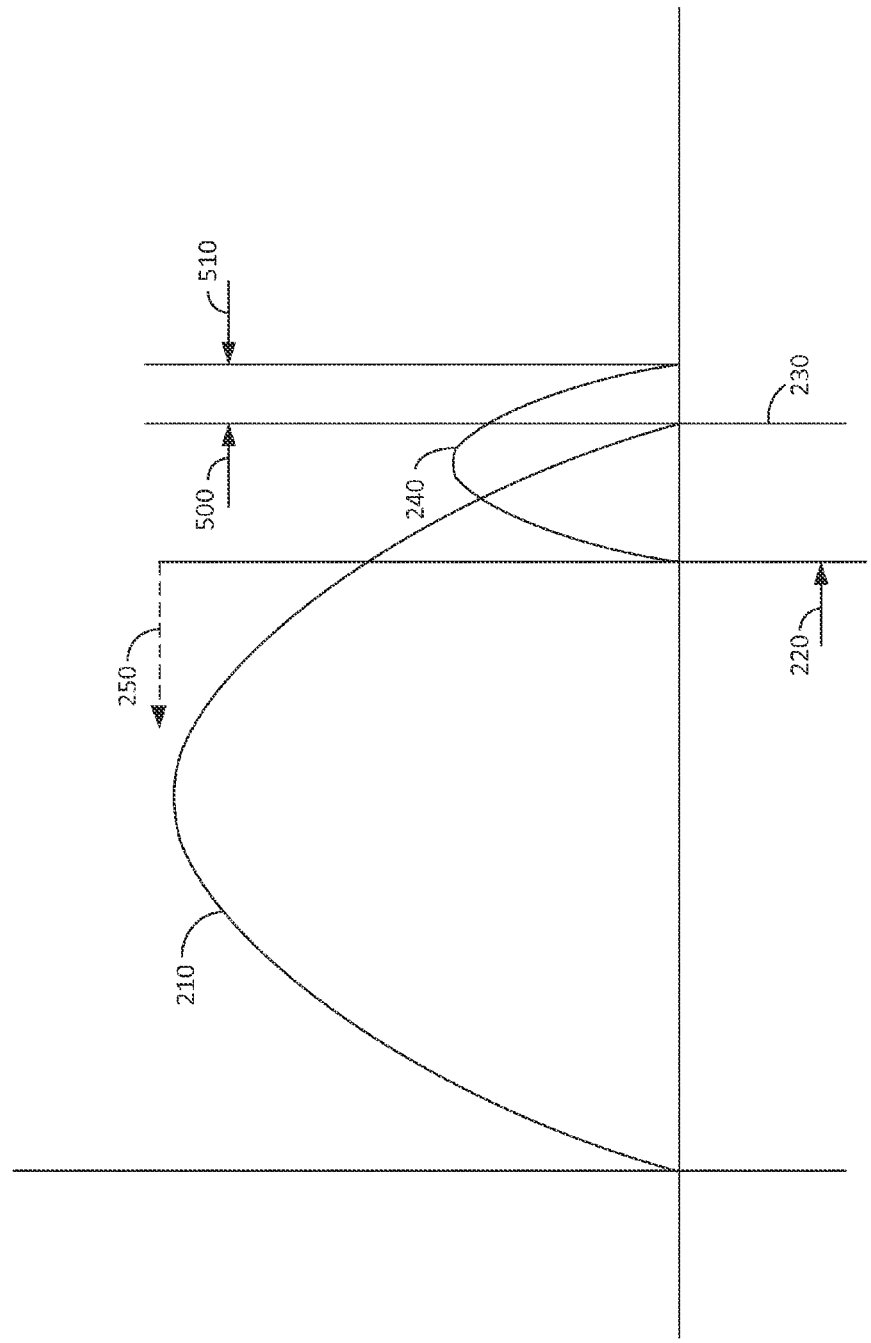
FIG. 5 is yet another graphical representation of the principles involved for charging a battery in the startup phase, in accordance with one embodiment.

The control module 116 thereafter enables switching of switches 20-34 between the angle $\alpha_{ref}$ and the zero-crossing of the AC energy source 120. (Step 480). In one embodiment, for example, the control module 116 may utilize a phase locked loop (PLL) to determine when the zero crossing occurs. In some instances, for example, the current flowing to the battery may not have dropped to zero before the zero-crossing of the AC energy source 120. FIG. 5 is yet another graphical representation of the principals involved for charging a battery in the startup phase. As seen in FIG. 5, the current 240 being provided by the electrical system 100 to the battery is still greater than zero when the voltage of the AC source 120 crosses the zero crossing 230. Accordingly, when this occurs, the control module 116 will continue to enable the switching of switches 20-34 for the period illustrated by arrows 500 and 510. In other words, the control module 116 continues to enable to the switches 20-34 as the current being provided to the load (IL) multiplied by the voltage of the AC source (Vac) is less than zero (i.e., IL×Vac<0). The control module 116 then begins the process again for the next half cycle of the AC voltage source 120 and continues to charge the battery via the method described herein until the voltage of the battery reaches the peak voltage of the AC energy source 120.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A charging system for charging a battery, comprising:
  a first interface configured to receive a voltage from an alternative current (AC) voltage source;

a matrix conversion module comprising a plurality of switches electrically connected to the first interface and configured to provide a charging voltage to the battery; and a controller communicatively connected to the matrix conversion module, wherein the controller is configured to:

determine a voltage of the battery;

determine an initiation angle of the AC voltage source to initiate charging of the battery based upon the voltage of the battery; and control the plurality of switches to provide the charging voltage to the battery when an angle of the received voltage of the AC voltage source is between the determined initiation angle of the AC voltage source and a subsequent zero-crossing of the AC voltage source.

2. The charging system of claim 1, wherein the controller is further configured to:

determine a lower bound for the determined initiation angle based upon the voltage of the battery and a peak voltage of the AC voltage source; and bound the determined initiation angle to the lower bound when the determined angle is lower than the lower bound.

3. The charging system of claim 2, wherein the lower bound is determined based upon the following equation:

$$\alpha min = \frac{1}{\pi}\arcsin\left(\frac{Vout}{Vacmax}\right),$$

where αmin is the lower bound, Vout is the voltage of the battery and Vacmax is the peak voltage of the AC voltage source.

4. The charging system of claim 3, wherein the controller is further configured to:

determine an upper bound for the determined initiation angle based upon the voltage of the battery, the peak voltage of the AC voltage source, a maximum desired current in the charging system and the determined lower bound; and bound the determined initiation angle to the upper bound when the determined angle is greater than the upper bound.

5. The charging system of claim 4, wherein the controller is further configured to determine the upper bound using a multi-dimensional lookup table.

6. The charging system of claim 5, wherein the multi-dimensional lookup table is based upon the following equation:

$$ILmax = \frac{Vacmax}{\omega L}\left(\frac{Vout}{Vacmax}\pi(\alpha min - \alpha max) + \cos(\pi\alpha min) - \cos(\pi\alpha max)\right),$$

where ILmax is the maximum desired current in the charging system, ω is an angular frequency in rad/s dependent on the grid frequency, L is an inductance of an inductor in the matrix conversion module, and αmax is the upper bound.

7. The charging system of claim 1, wherein the controller is further configured to:

monitor a current flowing into the battery caused by the charging voltage; and controlling the plurality of switches to provide the charging voltage to the battery until the current flowing into the battery approaches zero.

8. The charging system of claim 1, wherein the controller is further configured to:

control the plurality of switches to provide the charging voltage to the battery when the determined voltage of the battery is less than a peak voltage of the AC voltage source; and control the plurality of switches to provide a boosted voltage to the battery when the determined voltage of the battery is greater than the peak voltage of the AC voltage source.

9. A method for charging a battery in a charging system using an alternating current (AC) voltage source coupled to a matrix conversion module, the method comprising:

determining, by a control module, a voltage of the battery;

determining, by the control module, an initiation angle of the AC voltage source to initiate charging of the battery based upon the voltage of the battery; and controlling, by the control module, the matrix conversion module to provide a charging voltage to the battery when an angle of the received voltage of the AC voltage source is between the determined initiation angle of the AC voltage source and a subsequent zero-crossing of the AC voltage source.

10. The method of claim 9, further comprising:

determining, by the control module, a lower bound for the determined initiation angle based upon the voltage of the battery and a peak voltage of the AC voltage source; and bounding, by the control module, the determined initiation angle to the lower bound when the determined angle is lower than the lower bound.

11. The method of claim 10, wherein the lower bound is determined based upon the following equation:

$$\alpha min = \frac{1}{\pi}\arcsin\left(\frac{Vout}{Vacmax}\right),$$

where αmin is the lower bound, Vout is the determined voltage of the battery and Vacmax is the peak voltage of the AC voltage source.

12. The method of claim 11, further comprising:

determining, by the control module, an upper bound for the determined initiation angle based upon the voltage of the battery, the peak voltage of the AC voltage source, a maximum desired current in the charging system, and the determined lower bound; and bounding, by the control module, the determined initiation angle to the upper bound when the determined angle is greater than the upper bound.

13. The method of claim 12, furthering comprising determining, by the control module, the upper bound using a multi-dimensional lookup table.

14. The method of claim 13, wherein the multi-dimensional lookup table is based upon the following equation:

$$ILmax = \frac{Vacmax}{\omega L}\left(\frac{Vout}{Vacmax}\pi(\alpha min - \alpha max) + \cos(\pi\alpha min) - \cos(\pi\alpha max)\right),$$

where ILmax is the maximum desired current in the charging system, ω is an angular frequency in rad/s dependent on the grid frequency, L is an inductance of an inductor in the matrix conversion module, and αmax is the upper bound.

15. The method of claim 9, further comprising:
monitoring, by the control module, a current flowing into the battery caused by the charging voltage; and
controlling, by the control module, the matrix conversion module to provide the charging voltage to the battery until the current flowing into the battery approaches zero.

16. The method of claim 9, further comprising:
controlling, by the control module, the matrix conversion module to provide the charging voltage to the battery when the determined voltage of the battery is less than a peak voltage of the AC voltage source; and
controlling, by the control module, the matrix conversion module to provide a boosted voltage to the battery when the determined voltage of the battery is greater than the peak voltage of the AC voltage source.

17. A charging system for charging a battery, comprising:
a first interface configured to receive a voltage from an alternative current (AC) voltage source;
an energy conversion module comprising a plurality of switches electrically connected to the first interface and configured to provide a charging voltage to the battery; and
a controller communicatively connected to the energy conversion module, wherein the controller is configured to:
control the plurality of switches to provide the charging voltage to the battery when a voltage of the battery is less than a peak voltage of the AC voltage source, the plurality of switches providing the charging voltage utilizing the voltage from the AC power source when an angle of the AC power source is between a determined initiation angle of the AC voltage source and a subsequent zero-crossing of the AC voltage source; and
control the plurality of switches to provide a boosted voltage to the battery when the voltage of the battery is greater than the peak voltage of the AC voltage source.

18. The charging system of claim 17, wherein the controller is further configured to:
determine the voltage of the battery; and
determine the initiation angle of the AC voltage source to initiate charging of the battery based upon the voltage of the battery.

19. The charging system of claim 18, wherein the controller is further configured to:
determine a lower bound for the determined initiation angle based upon the voltage of the battery and the peak voltage of the AC voltage source; and
bound the determined angle to the lower bound when the determined initiation angle is lower than the lower bound, wherein the lower bound is determined based upon the following equation:

$$\alpha min = \frac{1}{\pi} \arcsin\left(\frac{Vout}{Vacmax}\right),$$

where αmin is the lower bound, Vout is the voltage of the battery and Vacmax is the peak voltage of the AC voltage source.

20. The charging system of claim 19, wherein the controller is further configured to:
determine an upper bound for the determined initiation angle based upon the voltage of the battery, the peak voltage of the AC voltage source, a maximum desired current in the charging system and the determined lower bound; and
bound the determined initiation angle to the upper bound when the determined angle is greater than the upper bound,
wherein the controller is further configured to determine the upper bound using a multi-dimensional lookup table, and
the multi-dimensional lookup table is based upon the following equation:

$$ILmax = \frac{Vacmax}{\omega L}\left(\frac{Vout}{Vacmax}\pi(\alpha min - \alpha max) + \cos(\pi \alpha min) - \cos(\pi \alpha max)\right),$$

where ILmax is the maximum desired current in the charging system, ω is an angular frequency in rad/s dependent on the grid frequency, L is an inductance of an inductor in the energy conversion module, and αmax is the upper bound.

* * * * *